United States Patent [19]

Fujiwara et al.

[11] Patent Number: 5,097,353
[45] Date of Patent: Mar. 17, 1992

[54] OPTICAL REPEATER HAVING PHASE INVERSION CIRCUIT

[75] Inventors: Haruo Fujiwara, Sagamihara; Mitsuo Kitamura, Kawasaki, both of Japan

[73] Assignee: Fujitsu Limited, Kanagawa, Japan

[21] Appl. No.: 592,365

[22] Filed: Oct. 3, 1990

[30] Foreign Application Priority Data

Oct. 6, 1989 [JP] Japan .................................. 1-262455
Apr. 19, 1990 [JP] Japan .................................. 2-101691

[51] Int. Cl.$^5$ ............................................. H04B 10/16
[52] U.S. Cl. ......................................... 359/177; 375/3
[58] Field of Search ...................... 375/3, 3.1, 4; 370/13.1; 379/340, 342, 343, 344; 371/20.2; 359/177; 455/9

[56] References Cited

U.S. PATENT DOCUMENTS 4,698,826 10/1987 Denhez et al. ........................ 375/3
4,710,976 12/1987 Wakabayashi et al. ............. 370/13.1

OTHER PUBLICATIONS

J. C. Mouly, "Systematic Jitter Suppression by Pattern Inversion", Electronics Letters, 1st Aug. 1985, vol. 21, No. 16, pp. 709-710.

Primary Examiner—Kenneth A. Wieder
Assistant Examiner—Rafael Bacares
Attorney, Agent, or Firm—Helfgott & Karas

[57] ABSTRACT

An optical repeater includes a first converter converting an optical input signal into an electrical signal, an equalizing amplifier which amplifies the electrical signal and which outputs an amplified electrical signal, and a timing extraction circuit which extracts a timing signal from the amplified electrical signal. Also the optical repeater includes a phase inversion circuit which receives the amplified electrical signal in synchronism with the timing signal and which outputs a phase-inverted signal in synchronism with the timing signal. The phase-inverted signal has a phase opposite to a phase of the amplified electrical signal. Further, the optical repeater includes a second converter having a diffused laser diode and converting the phase-inverted signal into an optical output signal, and a supervisory signal extraction circuit which extracts a supervisory signal contained in the optical input signal from the phase-inverted signal. The optical input signal includes a digital signal formed of a plurality of blocks. Each block has data composed of $(2m+1)$ bit (where m is an integer) and one-bit parity so that each block is formed of a $(2m+1)$B1P code having an even parity.

15 Claims, 8 Drawing Sheets

OPTICAL REPEATER HAVING PHASE INVERSION CIRCUIT

BACKGROUND OF THE PRESENT INVENTION

The present invention generally relates to an optical repeater provided in an optical communication system, such as an optical submarine (undersea) repeater. More particularly, the present invention relates to an optical repeater having a phase inversion circuit designed to invert the phase of an optical input signal in digital form and output an optical signal having the inverted phase.

The reduction of a transmission loss of an optical fiber makes it possible to increase an interval at which adjacent repeaters are arranged, so that a long-distance transmission of optical signals can be easily realized. In such a long-distance transmission of optical signals, there is a problem of systematic jitter accumulation arising from an arrangement in which an optical signal passes through a plurality of repeaters. Thus, it is necessary to reduce systematic jitter accumulation, particularly in the long-distance transmission.

Figure 1:
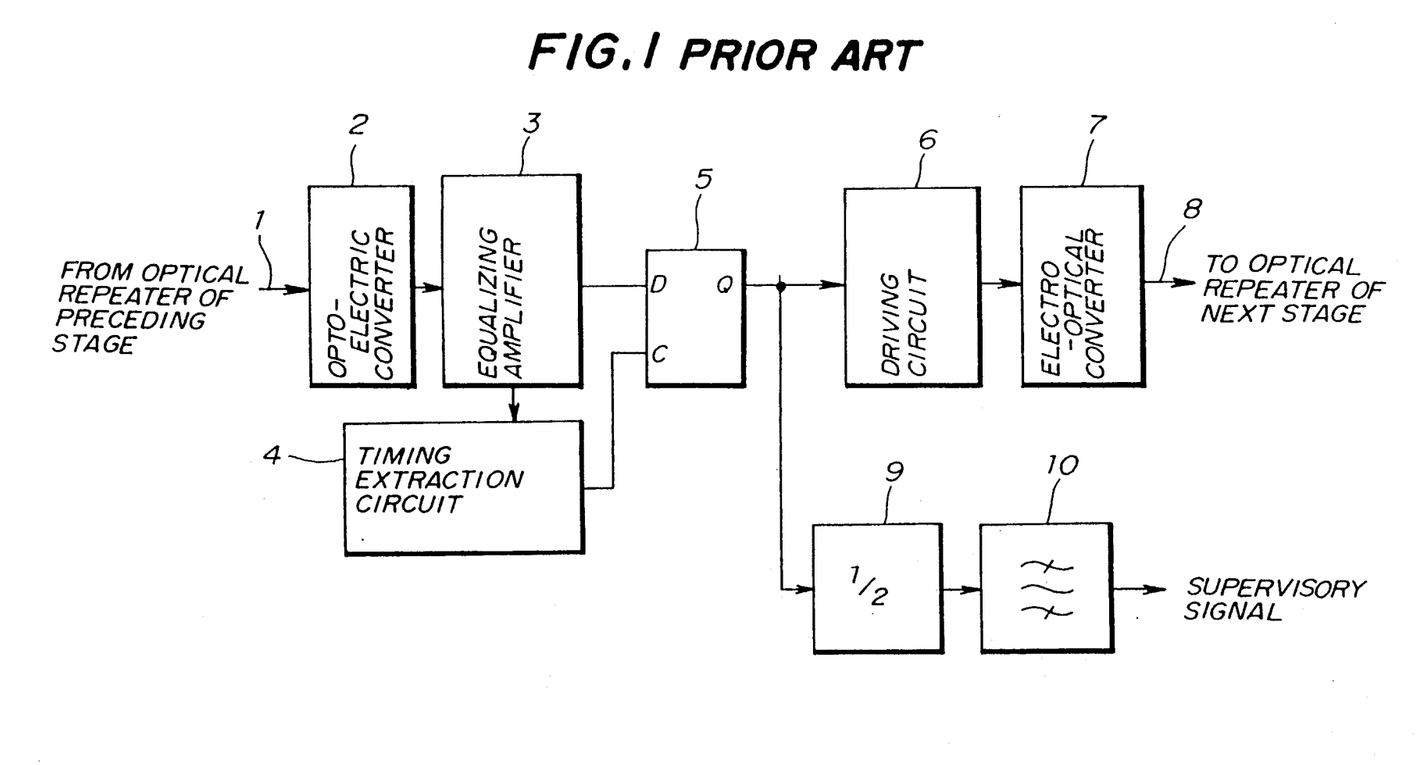
FIG 1 is a block diagram of a conventional optical repeater.

Referring to FIG. 1, there is illustrated a conventional optical repeater. The optical repeater shown in FIG. 1 is composed of an opto-electric converter 2 connected to an optical transmission line 1, an equalizing amplifier 3, a timing extraction circuit 4, a D-type flip-flop 5, a driving circuit 6, an electro-optical converter 7 coupled to an optical transmission line 8, a frequency divider 9 and a bandpass filter 10.

An optical digital signal via the optical transmission line 1 is converted into an electrical signal by the opto-electric converter 2. The equalizing amplifier 3 amplifies and equalizes the electrical signal from the opto-electric converter 2. An output signal of the equalizing amplifier 3 is input to a terminal D of the flip-flop 5 and the timing extraction circuit 4. The timing extraction circuit 4 generates a timing signal from the output signal from the equalizing amplifier 3. The timing signal generated by the timing extraction circuit 4, which is synchronized with the optical digital signal, is applied to a clock terminal C of the flip-flop 5.

The output signal of the equalizing amplifier 3 is latched in synchronism with the timing signal, and a regenerated digital signal is output via a terminal Q of the flip-flop 5. The reproduced digital signal is input to the driving circuit 6 and the frequency divider 9. The driving circuit 6 drives a laser diode provided in the electro-optical converter 7, which outputs a regenerated and amplified optical digital signal to the transmission line 8. On the other hand, the frequency divider 9 has a flip-flop, which generates a signal having a frequency half the frequency of the signal output from the flip-flop 5. The signal generated and output by the frequency divider 9 passes through the bandpass filter 10, which generates a supervisory signal.

Normally, the optical digital signal is transmitted via the optical transmission lines 1 and 8 in the form of a 24B1P code. The 24B1P code is composed of 24 data bits and a one-bit parity P relative to the 24 data bits. One block is formed of these 25 bits. Normally, if the initial state of the flip-flop of the frequency divider 9 is equal to "0" and no bit error occurs, the output signal of the flip-flop is always equal to "0" at the end of one block, because the number of "1" is even. On the other hand, if the initial state of the flip-flop of the frequency divider 9 is equal to "1" and no bit error occurs, the output signal of the flip-flop is always equal to "1".

Figure 2A:
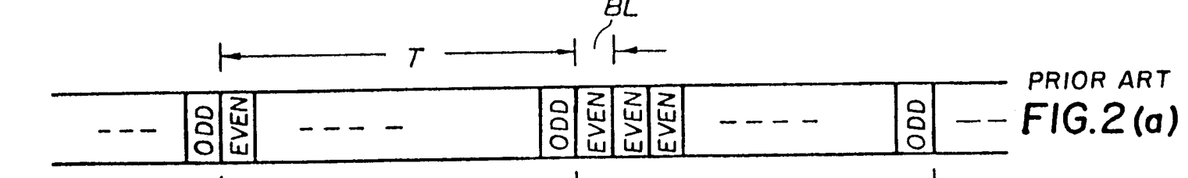
FIGS. 2a, b are diagrams illustrating how to extract a supervisory signal from an optical signal having the 24B1P format.
Figure 2B:
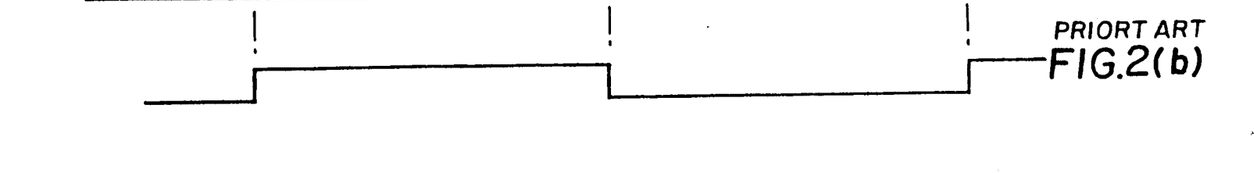

Referring to FIG. 2-(a), symbol BL denotes one block, and T denotes a predetermined period during which a plurality of blocks, each having the even parity, are transmitted. Odd parities are inserted at intervals corresponding to the predetermined period T. That is, one odd parity is inserted for every period T. The output signal of the frequency divider 9 is inverted each time the odd parity is applied thereto. In other words, the flip-flop of the frequency divider 9 changes its status each time the odd parity is applied thereto (for every period T). The bandpass filter 6 has a bandpass range having a central frequency substantially corresponding to the reciprocal of the period T, and extracts signal components in the bandpass range. Thus, it is possible to superimpose a low-bit rate supervisory signal on a high-speed data signal and extract this supervisory signal by the combination of the frequency divider 9 and the bandpass filter 10.

In conventional optical repeaters as described above, the repeated optical signal output from each repeater has the same phase as the optical signal input to each repeater. That is, logic "1" of the input signal is transmitted as it is (logic "1"). In a case where a single-mode semiconductor laser diode, such as a DFB (distributed feedback laser diode), is used, a wavelength shift (charping) occurs at the rise and fall of a driving current applied to the laser diode. An optical signal having such a wavelength shift is affected by the wavelength distribution characteristics of the optical transmission lines 1 and 8, so that variations in the rise and fall of the optical signal on the time base, that is, systematic jitter is caused.

Systematic jitter is caused at each optical repeater, so that systematic jitter accumulation occurs in a long-distance transmission. The existence of systematic jitter accumulation deteriorates the transmission quality. For this reason, there are limits of the bit rate of data and the number of repeaters provided in the optical communication system.

SUMMARY OF THE INVENTION

It is a general object of the present invention to provide an improved optical repeater in which the above-mentioned disadvantages are eliminated.

A more specific object of the present invention is to provide an optical repeater capable of effectively suppressing systematic jitter and easily extracting a supervisory or command signal superimposed on optical signals transmitted via transmission lines.

The above-mentioned objects of the present invention are achieved by an optical repeater comprising a first converter converting an optical input signal into an electrical signal, an equalizing amplifier which amplifies the electrical signal and which outputs an amplified electrical signal, and a timing extraction circuit which extracts a timing signal from the amplified electrical signal. Also the optical repeater includes a phase inversion circuit which receives the amplified electrical signal in synchronism with the timing signal and which outputs a phase-inverted signal in synchronism with the timing signal. The phase-inverted signal has a phase opposite to a phase of the amplified electrical signal. Further, the optical repeater includes a second converter having a diffused laser diode and converting the phase-inverted signal into an optical output signal, and a supervisory signal extraction circuit which extracts a supervisory signal contained in the optical input signal from the phase-inverted signal. The optical input signal includes a digital signal formed of a plurality of blocks. Each block has data composed of (2m+1) bit (where m is an integer) and one-bit parity so that each block is formed of a (2m+1)B1P code having an even parity.

The aforementioned objects of the present invention are also achieved by an optical repeater comprising: first converter means for converting an optical input signal into an electrical signal; equalizing amplifier means, coupled to the first converter means, for amplifying the electrical signal and for outputting an amplified electrical signal; timing extraction means, coupled to the equalizing amplifier means, for extracting a timing signal from the amplified electrical signal; phase inversion means, coupled to the equalizing amplifier and the timing extraction means, for receiving the amplified electrical signal in synchronism with the timing signal and for outputting an in-phase signal and a phase-inverted signal in synchronism with the timing signal, the in-phase signal being in phase with the amplified electrical signal, and the phase-inverted signal having a phase opposite to a phase of the amplified electrical signal; second converting means, coupled to the phase inversion means, for converting the phase-inverted signal into an optical output signal; and supervisory signal extracting means, coupled to the phase inversion means, for extracting a supervisory signal contained in the optical input signal from one of the in-phase signal and the phase-inverted signal.

DESCRIPTION OF THE PREFERRED EMBODIMENTS

A description will now be described of an optical repeater according to a first preferred embodiment of the present invention with reference to FIG. 3.

Figure 3:
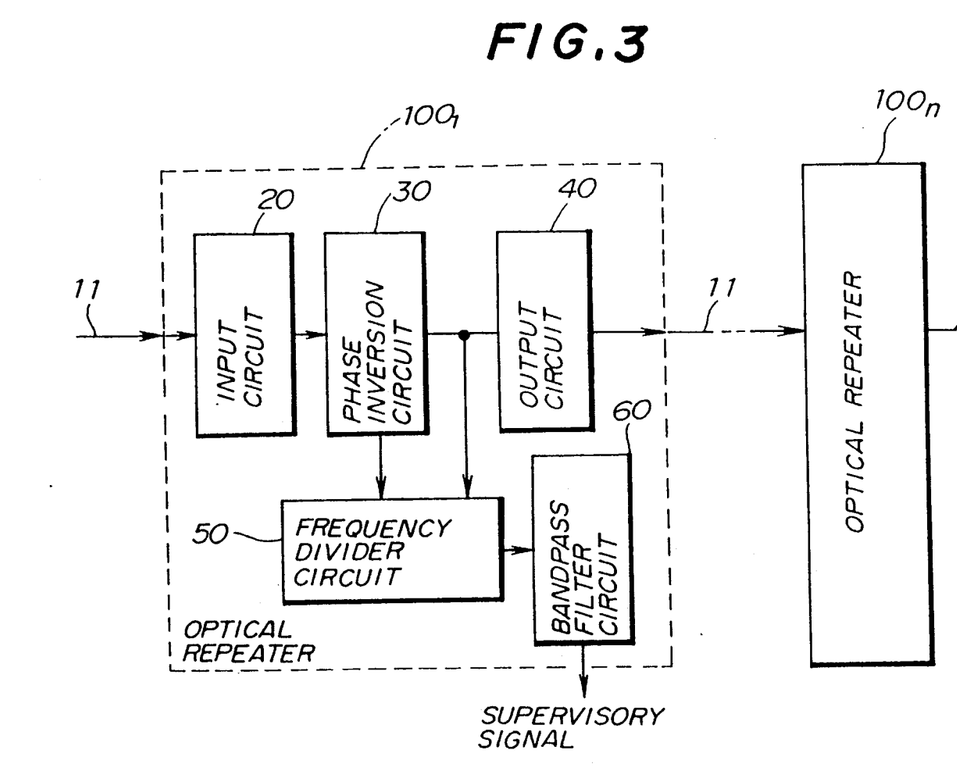
FIG. 3 is a block diagram illustrating the outline of an optical repeater according to a first preferred embodiment of the present invention.

An optical transmission system shown in FIG. 3 includes a plurality of optical repeaters $100_1, \ldots, 100_n$ (n is an integer) provided in an optical transmission line 11 such as an optical fiber cable. Each of the optical repeaters $100_1, \ldots, 100_n$ is composed of an input circuit 20, a phase inversion circuit 30, an output circuit 40, a frequency divider circuit 50 and a bandpass filter circuit 60.

Figure 4:
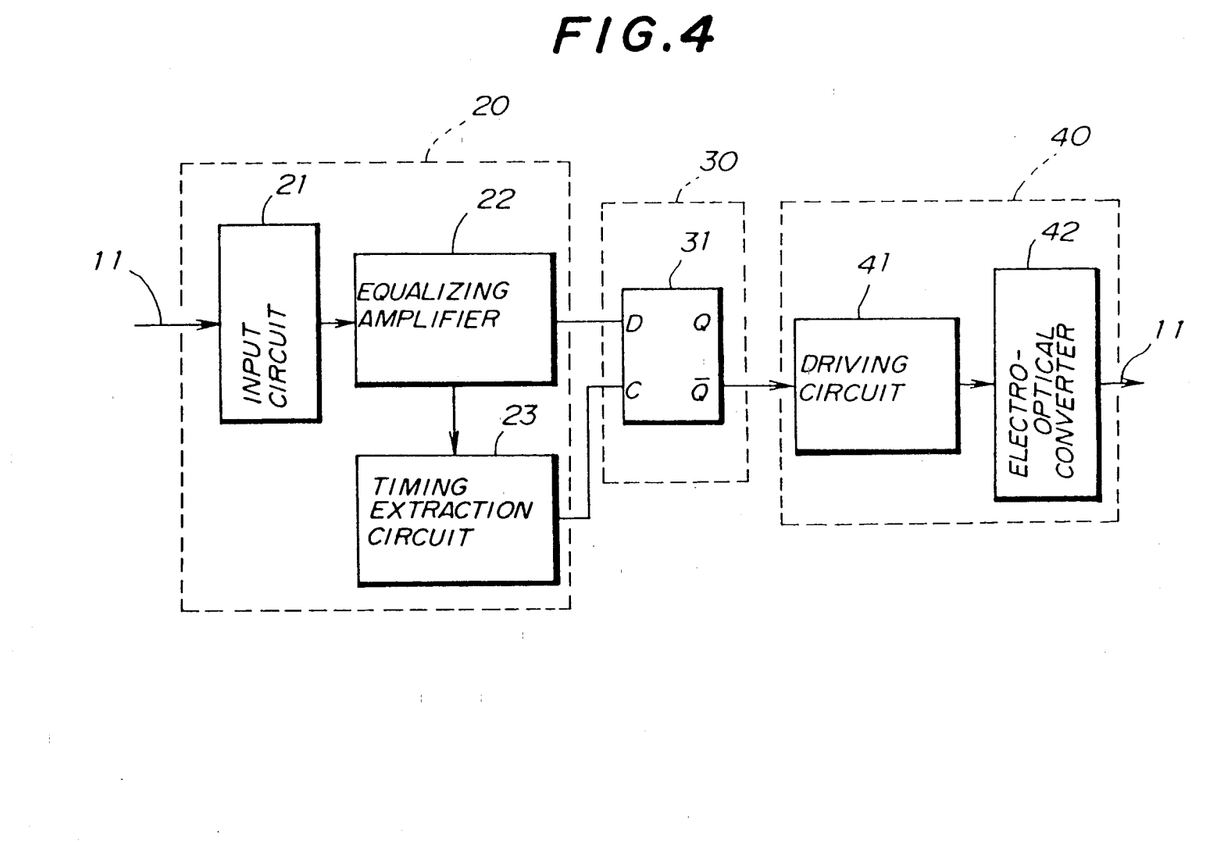
FIG. 4 is a block diagram illustrating the structures of an input circuit, a phase inversion circuit and an output circuit provided in the optical repeater shown in FIG. 3.

As shown in FIG. 4, the input circuit 20 is composed of an opto-electric converter 21, an equalizing amplifier 22 and a timing generator 23, which correspond to the opto-electric converter 2, the equalizing amplifier 3 and the timing generation circuit 4 shown in FIG. 1, respectively. The opto-electric converter 2 is formed of, for example, an avalanche diode. The phase inversion circuit 30 has a D-type flip-flop 31. The output circuit 40 is composed of a driving circuit 41 and an electro-optical converter 42, which correspond to the driving circuit 6 and the electro-optical converter 7 shown in FIG. 1, respectively. The electro-optical converter 42 is formed of, for example, DFB laser diode.

The flip-flop 31 of the phase inversion circuit 30 has a data terminal D, a clock terminal C, and two output terminals Q and $\overline{Q}$. An output terminal of the equalizing amplifier 22 is connected to the data terminal D of the flip-flop 31, and an output terminal of the timing extraction circuit 23 is connected to the clock terminal C thereof. It should be noted that the terminal $\overline{Q}$ of the flip-flop 31 is connected to an input terminal of the driving circuit 41 of the output circuit 40. Conventionally, as shown in FIG. 1, the terminal Q of the flip-flop 9 is connected to the driving circuit 6.

An incoming optical digital signal via the transmission line 11 is converted into an electrical signal by the opto-electric converter 21. The electrical signal generated and output by the opto-electric converter 21 is equalized and amplified by the equalizing amplifier 22. An equalized and amplified signal from the equalizing amplifier 22 is input to the data terminal D of the flip-flop 31 of the phase inversion circuit 30. On the other hand, the equalized and amplified signal from the equalizing amplifier 22 is input to the timing extraction circuit 23, which outputs a timing signal synchronized with the optical digital signal to the clock terminal C of the flip-flop 31. A signal (phase-inverted signal) at the terminal $\overline{Q}$ of the flip-flop 31 has a phase opposite to the phase of the signal at the data terminal D thereof.

Figure 5A:
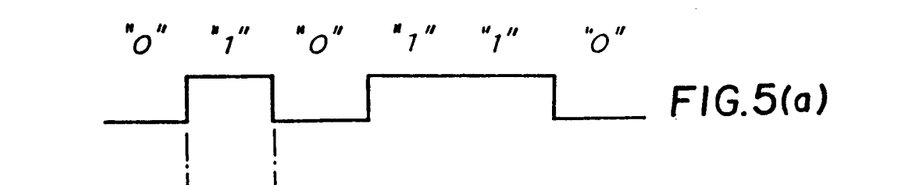
FIGS. 5a-c are waveform diagram illustrating the operation of the phase inversion circuit shown in FIGS. 3 and 4.
Figures 5B, 5C:
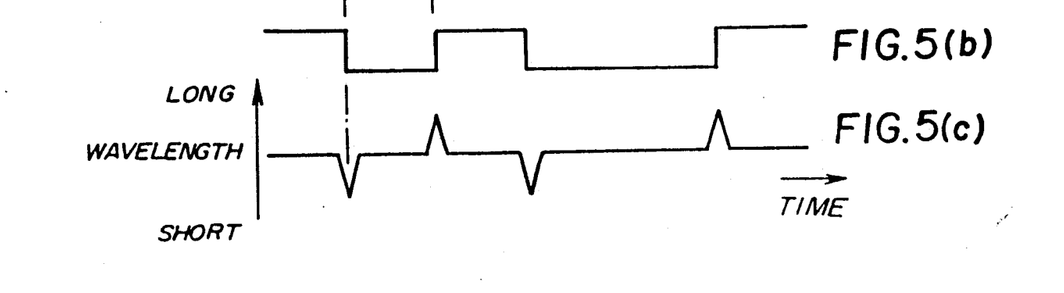

The optical signal which penetrates in the optical transmission line 11 has been amplitude-modulated. For example, as shown in FIG. 5-(a), the optical digital signal has been amplitude-modulated in accordance with data "0", "1", "0", "1", "1" and "0". The optical repeater $100_1$ outputs an optical output signal in digital form shown in FIG. 5-(b) when the optical input signal shown in FIG. 5-(a) is input thereto. It can be seen from FIG. 5 that the optical output signal in FIG. 5-(b) has a phase opposite to that of the optical input signal in FIG. 5-(a). FIG. 5-(c) illustrates a variation in the wavelength of the optical output signal. The wavelength of the optical output signal changes toward a short wavelength in response to the fall of the optical output signal. On the other hand, the wavelength of the optical output signal changes toward a long wavelength in response to the rise of the optical output signal.

Thus, the rise timing of the optical digital signal which is input to the optical repeater being considered corresponds to the fall timing of the optical digital signal which is output therefrom. Thus, a waveform variation caused when the optical digital signal input to the optical repeater rises is cancelled by a waveform variation caused when the optical digital signal output therefrom falls. With this arrangement, it becomes possible to cancel the affection of charping and prevent the deterioration of the transmission quality.

If an even number of optical repeaters is provided between terminal equipment devices, the phase of the optical digital signal sent by the terminal equipment device on the transmission side is the same as that of the optical digital signal received by the receive-side terminal equipment device via the even number of optical repeaters. On the other hand, if an odd number of optical repeaters is provided, the phase of the optical digital signal on the transmission side is opposite to that of the optical digital signal on the receive side. In this case, it is preferable to provide the receive-side terminal equipment device with a circuit designed to change the phase of the received optical digital signal.

Figure 6:
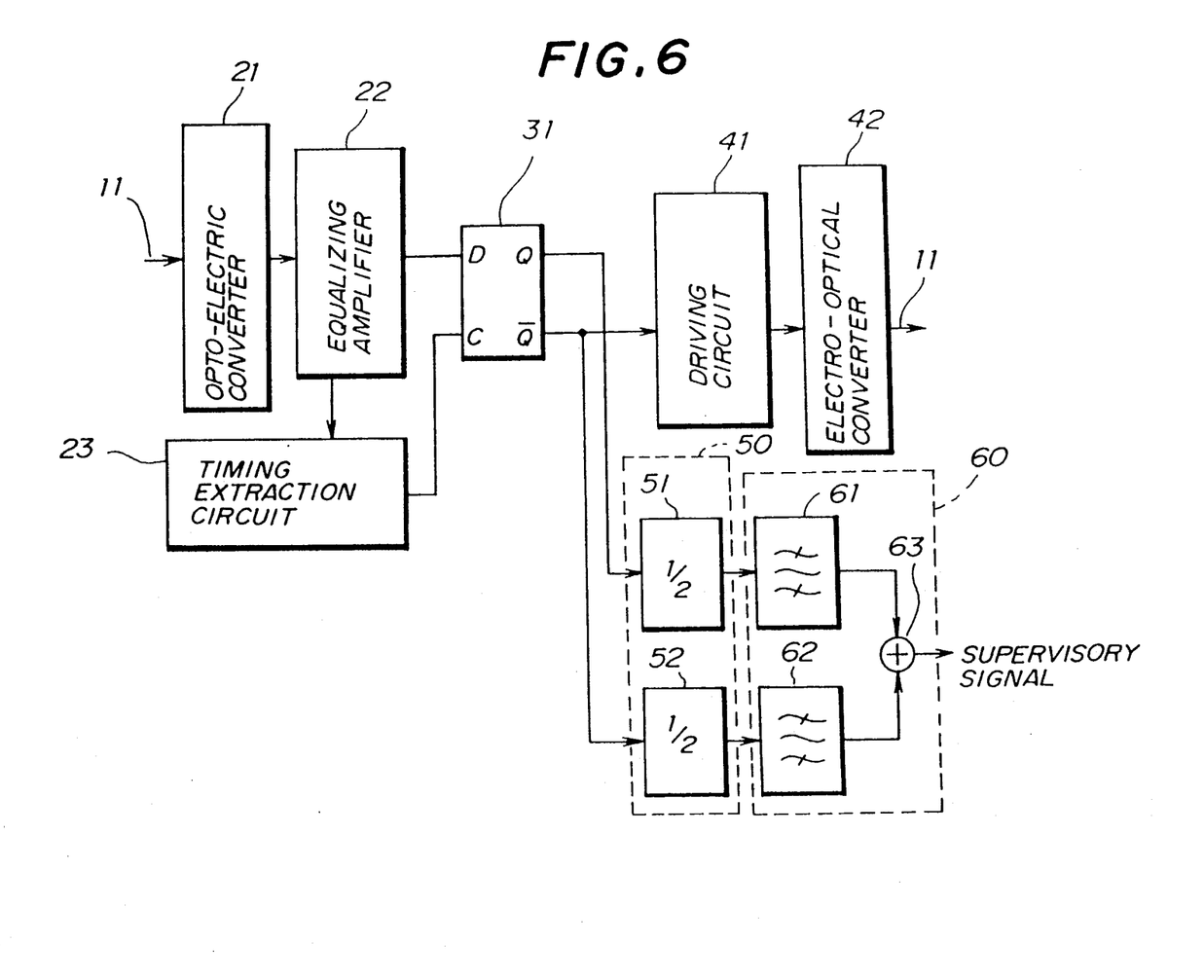
FIG. 6 is a detailed block diagram illustrating the entire structure of the optical repeater shown in FIG. 3.

FIG. 6 illustrates the configuration of the frequency divider circuit 50 and the bandpass filter circuit 60 shown in FIG. 3 together with the other arrangement shown in FIG. 4. In FIG. 6, those parts which are the same as those shown in FIGS. 3 and 4 are given the same reference numerals. The frequency divider circuit 50 is composed of two frequency dividers 51 and 52. The frequency divider 51 has an input terminal connected to the terminal Q of the flip-flop 31 of the phase inversion circuit 30, and an output terminal. The frequency divider 52 has an input terminal connected to the terminal $\overline{Q}$ of the flip-flop 31 and an output terminal. It will be noted that the phase of the signal at the data terminal D of the flip-flop 31 is the same as that of the signal (in-phase signal) at the terminal Q thereof, and opposite to that of the signal (phase-inverted signal) at the terminal $\overline{Q}$ thereof. Each of the frequency dividers 51 and 52 divides the frequency of the corresponding input signal by 2. That is, each of the frequency dividers 51 and 52 generates an output signal having a frequency half the frequency of the signal applied thereto.

The bandpass filter circuit 60 is composed of bandpass filters 61 and 62, and an adder 63. The bandpass filters 61 and 62 have input terminals respectively connected to the output terminals of the frequency dividers 51 and 52, and output terminals respectively connected to first and second input terminals of the adder 63.

If the optical digital signal input to the opto-electric converter 22 has the phase opposite to the phase of the signal transmitted by the terminal on the transmission side, a phase-inverted digital signal is output from the terminal $\overline{Q}$ of the flip-flop 25. Thus, the phase-inverted digital signal at the terminal $\overline{Q}$ of the flip-flop 25 has the phase identical to the phase on the transmission side. This phase-inverted digital signal is input to the frequency divider 52, which generates a signal having a frequency half that of the phase-inverted digital signal. The signal generated and output by the frequency divider 52 passes through the bandpass filter 62, which outputs a supervisory or command signal having a period such as shown in FIG. 2. The supervisory or command signal is used for monitoring the status of predetermined devices in the optical repeater and sending information about the monitored status to the terminal on the transmission or reception side.

It will be noted that in the above-mentioned case, the output signal generated and output by the the frequency divider 51 has less supervisory signal component. Thus, the adder 63 outputs the supervisory signal extracted by the bandpass filter 62. Alternatively, it is possible to replace the adder 63 by an OR gate.

With the above-mentioned arrangement, it becomes possible to carry out the phase inversion repeat transmission by a plurality of optical repeaters having the same configuration. It will be noted that the supervisory signal is extracted by the combination of the frequency divider 51 and the bandpass filter 61 of each odd-numbered optical repeater, and on the other hand, the supervisory signal is extracted by the combination of the frequency divider 52 and the bandpass filter 62 of each even-numbered optical repeater.

Figure 7:
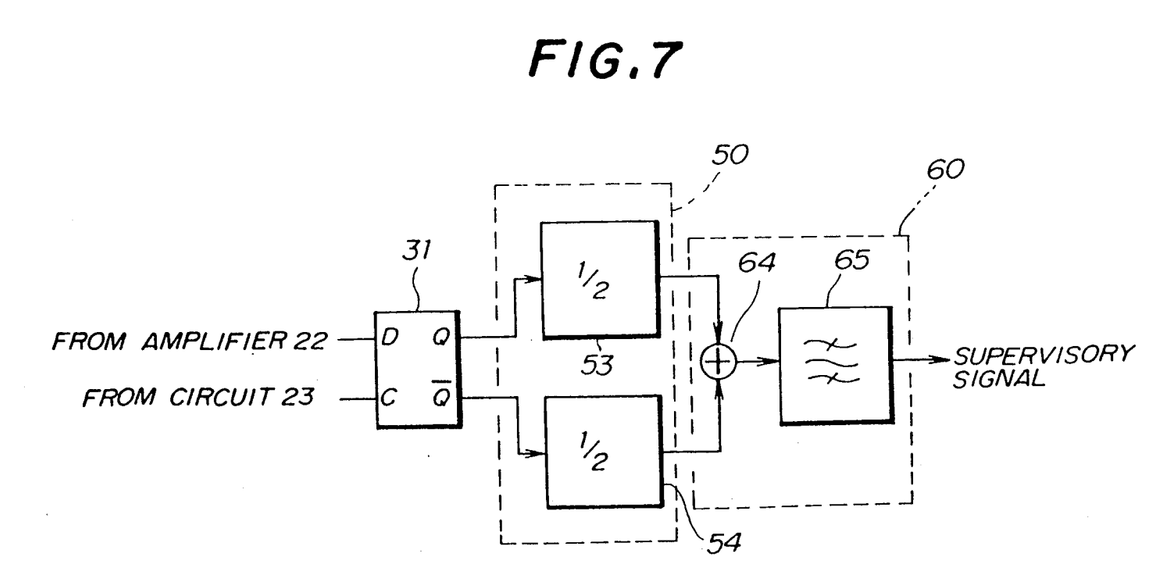
FIG. 7 is a block diagram illustrating a frequency divider circuit and a bandpass filter circuit according to a second preferred embodiment of the present invention.

A description will now be given of a second embodiment of the present invention with reference to FIG. 7, which illustrates the structure of the frequency divider circuit 50 and the bandpass filter circuit 60 according to the second embodiment of the present invention. The frequency divider circuit 50 shown in FIG. 7 is composed of frequency dividers 53 and 54, each having the same function as that of the frequency dividers 51 and 52 shown in FIG. 6. The bandpass filter circuit 60 shown in FIG. 7 is composed of an adder 64 and a single bandpass filter 65, which has the same function as each of the bandpass filters 61 and 62. The output terminals of the frequency dividers 53 and 54 are connected to first and second input terminals of the adder 64, respectively. The output terminal of the adder 64 is connected to the input terminal of the bandpass filter 65. It will be noted that the bandpass filter 65 is used in common for the frequency dividers 53 and 54. The configuration shown in FIG. 7 is more economical than the configuration shown in FIG. 6.

Figure 8:
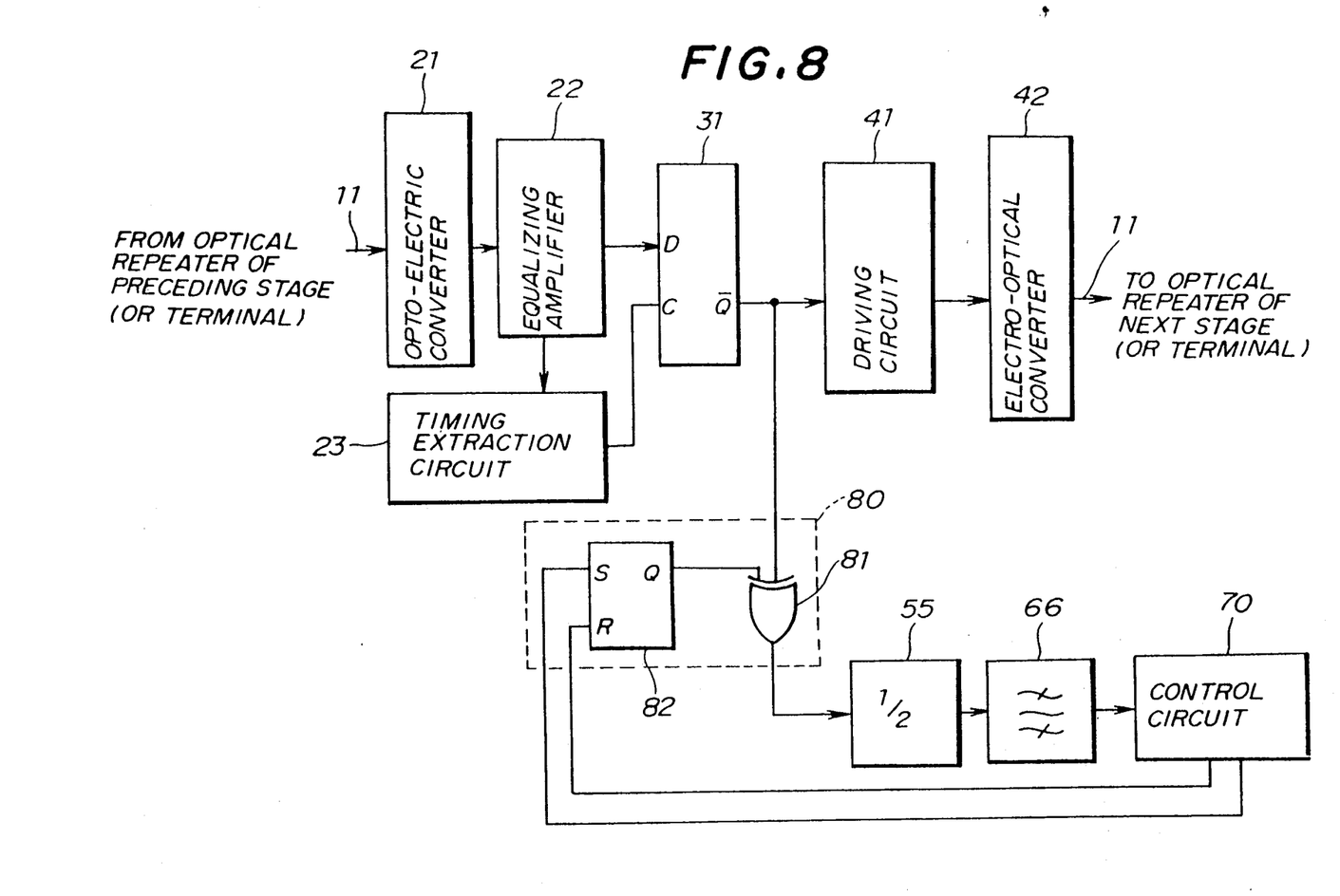
FIG. 8 is a block diagram illustrating the entire structure of an optical repeater according to a third preferred embodiment of the present invention.

A description will now be given of a third preferred embodiment of the present invention with reference to FIG. 8. In FIG. 8, those parts which are the same as those shown in FIG. 4 are given the same reference numerals.

The input circuit 20, the phase inversion circuit 30 and the output circuit 40 shown in FIG. 8 are the same as corresponding those shown in FIG. 4. The optical repeater shown in FIG. 8 is further composed of a frequency divider 55, a bandpass filter 66, a control circuit 70 and a switch circuit 80.

The switch circuit 80 has two modes of first and second modes. In the first mode, the switch circuit 80 passes the phase-inverted output signal from the terminal $\overline{Q}$ of the flip-flop 31 without changing the phase thereof. In the second mode, the switch circuit 80 inverts the phase of the phase-inverted output signal from the terminal $\overline{Q}$ of the flip-flop 31. The switch circuit 80 selects one of the first and second modes in accordance with a switch control signal, which is generated and output by the control circuit 70. The control circuit 70 receives a supervisory signal from the bandpass filter 66.

The switch circuit 80 is composed of an exclusive-OR gate 81 and an RS-type flip-flop 82. The exclusive-OR gate 81 has two input terminals, one of which being connected to the terminal Q of the flip-flop 31, and the other input terminal being connected to a terminal Q of the flip-flop 82. The exclusive-OR gate 81 has an output terminal connected to the input terminal of the frequency divider 55. The flip-flop 82 has a set terminal S and a reset terminal R, both of which are supplied with switching control signals generated and output by the control circuit 70.

When the power supply to an optical communication system having the optical repeater shown in FIG. 8 is turned ON, the flip-flop 82 is set to an initial state (reset or set state) due to a power ON reset function. For example, the terminal Q of the flip-flop 82 is set to a logically low level ("0"). Then, an optical signal having a command (supervisory) signal addressed to the optical repeater being considered is transmitted. If the optical signal being considered handles the non-inverted signal (having the same phase as the optical signal sent by the transmission side), the command signal is not extracted from the bandpass filter 66 where the flip-flop 82 is at the low level. In this case, an optical signal having an inverted command signal is transmitted. The optical repeater being considered receives the optical signal having the inverted command signal, and the command signal is output from the bandpass filter 66. The control circuit 70 decodes the command signal, and sends the control signal so that the state of the flip-flop 82 is changed. Thereby, the terminal Q of the flip-flop 82 is switched to a logically high level ("1"). As a result, an inverted version of the output signal obtained at the terminal $\overline{Q}$ of the flip-flop 31 is applied to the frequency divider 55.

Figures 9, 10:
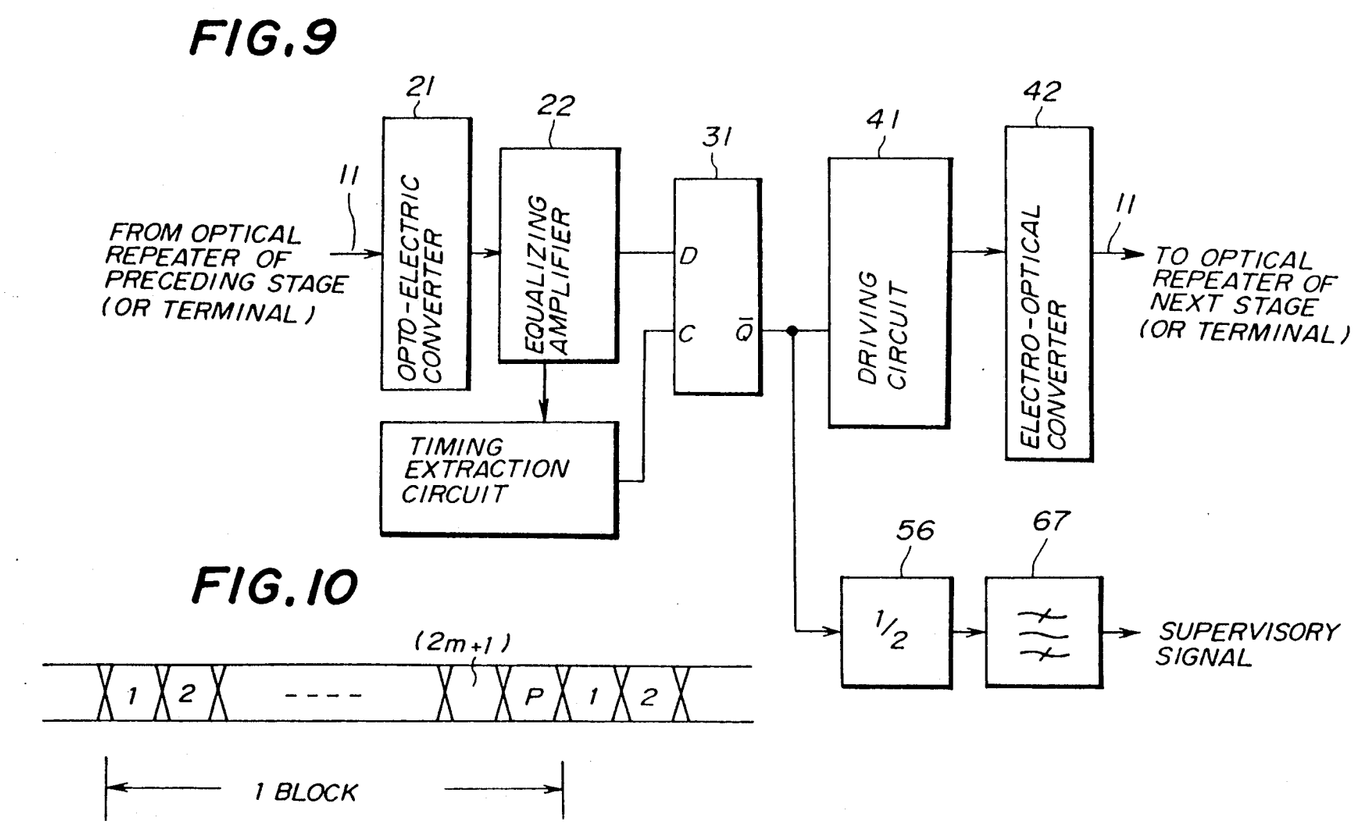
FIG. 9 is a block diagram illustrating the entire structure of an optical repeater according to a fourth preferred embodiment of the present invention.
FIG. 10 is a diagram illustrating a (2m+1)B1P code used in an optical transmission system using optical repeaters shown in FIG. 9.

A description will now be given of a fourth embodiment of the present invention with reference to FIGS. 9 and 10. In FIG. 9, those parts which are the same as those shown in FIGS. 4 and 8 are given the same reference numerals. The configuration shown in FIG. 9 is obtained by adding a frequency divider 56 and a bandpass filter 57 to the configuration shown in FIG. 4. The frequency divider 56 has an input terminal connected to the terminal Q of the flip-flop 31.

In an optical communication system using optical repeaters as shown in FIG. 9, a $(2m+1)$B1P code (m is an integer) is used in place of the aforementioned 2mB1P (m=12). This is directed to maintaining the even parity even in the phase inversion repeater transmission.

As shown in FIG. 10, a one-bit parity P is added to data composed of $(2m+1)$ bits, and a block having the even parity is transmitted. In this case, when m=11 and m=12, the 23B1P code and 25B1P code are obtained, respectively. Of course, m is not limited to these values. By using the $(2m+1)$B1P code, the condition of the even parity is not destroyed even if the phase of the optical input signal is inverted via each optical repeater, because the number of bits forming one block containing the parity bit P is even. A command signal (supervisory signal) can be superimposed on the optical digital signal by inserting the odd parity bits therein at predetermined intervals. Thus, it is possible to extract the command signal from the received optical digital signal by means of one frequency divider 56 and one bandpass filter 67.

The present invention is not limited to the specifically disclosed embodiments, and variations and modifications may be made without departing from the scope of the present invention.

What is claimed is:

1. An optical repeater comprising:
   first converter means for converting an optical input signal into an electrical signal;
   equalizing amplifier means, coupled to said first converter means, for amplifying said electrical signal and for outputting an amplified electrical signal;
   timing extraction means, coupled to said equalizing amplifier means, for extracting a timing signal from said amplified electrical signal;
   phase inversion means, coupled to said equalizing amplifier and said timing extraction means, for receiving said amplified electrical signal in synchronism with said timing signal and for outputting a phase-inverted signal in synchronism with said timing signal, said phase-inverted signal having a phase opposite to a phase of said amplified electrical signal;
   second converting means, having a diffused feedback laser diode and coupled to said phase inversion means, for converting said phase-inverted signal into an optical output signal; and
   supervisory signal extracting means, coupled to said phase inversion means, for extracting a supervisory signal contained in said optical input signal from said phase-inverted signal.

2. An optical repeater as claimed in claim 1, wherein:
   said optical input signal comprises a digital signal formed of a plurality of blocks; and
   each of said blocks has data composed of $(2m+1)$ bit (where m is an integer) and a one-bit parity so that each of said blocks is formed of a $(2m+1)$B1P code having an even parity.

3. An optical repeater comprising:
   first converter means for converting an optical input signal into an electrical signal;
   equalizing amplifier means, coupled to said first converter means, for amplifying said electrical signal and for outputting an amplified electrical signal;
   timing extraction means, coupled to said equalizing amplifier means, for extracting a timing signal from said amplified electrical signal;
   phase inversion means, coupled to said equalizing amplifier and said timing extraction means, for receiving said amplified electrical signal in synchronism with said timing signal and for outputting an in-phase signal and a phase-inverted signal in synchronism with said timing signal, said in-phase signal being in phase with said amplified electrical signal, and said phase-inverted signal having a phase opposite to a phase of said amplified electrical signal;
   second converting means, coupled to said phase inversion means, for converting said phase-inverted signal into an optical output signal; and
   supervisory signal extracting means, coupled to said phase inversion means, for extracting a supervisory signal contained in said optical input signal from one of said in-phase signal and said phase-inverted signal.

4. An optical repeater as claimed in claim 3, wherein said supervisory signal extracting means comprises:
   first supervisory signal extracting means, coupled to said phase inversion means, for extracting the supervisory signal contained in said optical input signal from said in-phase signal;
   second supervisory signal extracting means, coupled to said phase inversion means, for extracting the supervisory signal contained in said optical input signal from said phase-inverted signal; and
   output means, coupled to said first supervisory signal extracting means and said second supervisory signal extracting means, for outputting one of said in-phase signal and said phase-inverted signal.

5. An optical repeater as claimed in claim 4, wherein:
   said first supervisory signal extracting means comprises first frequency divider means for dividing a frequency of said in-phase signal and for outputting a first signal having a frequency half the frequency of said in-phase signal, and first filter means for extracting a first signal component from said first signal, said first signal component corresponding to said supervisory signal extracted from said in-phase signal; and said second supervisory signal extracting means comprises second frequency divider means for dividing a frequency of said phase-inverted signal and for outputting a second signal having a frequency half the frequency of said phase-inverted signal, and second filter means for extracting a second signal component from said second signal, said second signal component corresponding to said supervisory signal extracted from said phase-inverted signal.

6. An optical repeater as claimed in claim 5, wherein said output means comprises adder means for adding said first signal component output by said first supervisory signal extracting means and said second signal component output by said second supervisory signal extracting means.

7. An optical repeater as claimed in claim 5, wherein said output means comprises OR gate means for carrying out a logic OR operation between said first signal component signal output by said first supervisory signal extracting means and said second signal component output by said second supervisory signal extracting means.

8. An optical repeater as claimed in claim 3, wherein said supervisory extracting means comprises:
first frequency divider means for dividing a frequency of said in-phase signal and for outputting a first signal having a frequency half the frequency of said in-phase signal;
second frequency divider means for dividing a frequency of said phase-inverted signal and for outputting a second signal having a frequency half the frequency of said phase-inverted signal;
selecting means, coupled to said first frequency divider means and said second frequency divider means, for selecting one of said first signal and said second signal and for outputting a selected signal; and
filter means for extracting a predetermined signal component from said selected signal, said predetermined signal component corresponding to said supervisory signal extracted from one of said in-phase signal and said phase-inverted signal.

9. An optical repeater as claimed in claim 8, wherein said selecting means comprises adder means for adding said first signal output by said first frequency divider means and said second signal output by said second frequency divider means and for outputting an addition result corresponding to said one of said first signal and said second signal.

10. An optical repeater as claimed in claim 3, wherein said supervisory extracting means comprises:
switch means for inverting the phase of said phase-inverted signal when said phase-inverted signal has a phase opposite to that of said optical input signal obtained when said optical input signal is sent by a transmitter coupled to said optical repeater via an optical transmission line and for passing said phase-inverted signal without changing the phase thereof when said phase-inverted signal has a phase identical to that of said optical input signal obtained when said optical input signal is sent by said transmitter;

frequency divider means, coupled to said second switch means, for dividing a frequency of an output signal of said switch means and for generating a frequency-divided signal having a frequency half the frequency of said output signal of said switch means; and filter means, coupled to said frequency divider means, for extracting a predetermined signal component from said frequency-divided signal, said predetermined signal component corresponding to said supervisory signal.

11. An optical repeater as claimed in claim 10, wherein said switch means comprises:
flip-flop means for changing its status in accordance with a predetermined condition and for outputting a status signal;
an exclusive-OR gate having a first input terminal receiving said phase-inverted signal, a second input terminal receiving said status signal, and an output terminal coupled to said frequency divider means.

12. An optical repeater as claimed in claim 11, further comprising control means, coupled to said supervisory signal extracting means for generating a switch control signal from said supervisory signal, said switch control signal defining said predetermined condition and being applied to said flip-flop means.

13. An optical repeater as claimed in claim 11, wherein said flip-flop means comprises an RS-type flip-flop having set and reset terminals receiving said control signal, and an output terminal coupled to the second input terminal of said exclusive-OR gate.

14. An optical repeater as claimed in claim 3, wherein said phase inversion means comprises a D-type flip-flop having a data terminal receiving said amplified electrical signal, a clock terminal receiving said timing signal, a first output terminal outputting said in-phase signal, and a second output terminal outputting said phase-inverted signal 15. An optical repeater comprising:
first converter means for converting an optical input signal into an electrical signal;
equalizing amplifier means, coupled to said first converter means, for amplifying said electrical signal and for outputting an amplified electrical signal;
timing extraction means, coupled to said equalizing amplifier means, for extracting a timing signal from said amplified electrical signal;
phase inversion means, coupled to said equalizing amplifier and said timing extraction means, for receiving said amplified electrical signal in synchronism with said timing signal and for outputting a phase-inverted signal in synchronism with said timing signal, said phase-inverted signal having a phase opposite to a phase of said amplified electrical signal;
second converting means, coupled to said phase inversion means, for converting said phase-inverted signal into an optical output signal; and
supervisory signal extracting means, coupled to said phase inversion means, for extracting a supervisory signal contained in said optical input signal from said phase-inverted signal,
wherein said optical input signal comprises a digital signal formed of a plurality of blocks; and
each of said blocks has data composed of $(2m+1)$ bit (where m is an integer) and a one-bit parity so that each of said blocks is formed of a $(2m+1)$B1P code having an even parity.

* * * * *